US006272616B1

(12) United States Patent
Fernando et al.

(10) Patent No.: US 6,272,616 B1
(45) Date of Patent: Aug. 7, 2001

(54) METHOD AND APPARATUS FOR EXECUTING MULTIPLE INSTRUCTION STREAMS IN A DIGITAL PROCESSOR WITH MULTIPLE DATA PATHS

(75) Inventors: John S. Fernando, Coopersburg; Stefan Thurnhofer, Emmaus, both of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/099,192

(22) Filed: Jun. 17, 1998

(51) Int. Cl.[7] ....................................... G06F 15/00
(52) U.S. Cl. .............................................. 712/20
(58) Field of Search .................... 712/20, 21, 22, 712/23; 713/320, 324

(56) References Cited

U.S. PATENT DOCUMENTS

| 3,941,989 | * | 3/1976 | McLaughlin et al. ................ 713/321 |
| 4,279,020 | * | 7/1981 | Christian et al. ..................... 713/323 |
| 4,873,626 | | 10/1989 | Gifford ................................. 364/200 |
| 4,891,787 | | 1/1990 | Gifford ................................. 364/900 |
| 4,967,338 | * | 10/1990 | Klyohara et al. ....................... 712/32 |
| 5,212,777 | | 5/1993 | Gove et al. ........................... 395/375 |
| 5,239,654 | | 8/1993 | Ing-Simmons et al. ............. 395/800 |
| 5,355,508 | | 10/1994 | Kan ...................................... 395/800 |
| 5,478,856 | | 12/1995 | Kogge ................................... 395/800 |
| 5,535,410 | | 7/1996 | Watanabe et al. .................... 395/800 |
| 5,625,836 | | 4/1997 | Barker et al. ......................... 395/800 |
| 5,708,386 | | 1/1998 | Wilkinson et al. ................... 395/800 |

OTHER PUBLICATIONS

Converting Thread–Level Parallelism to Instruction–Level Parallelism via Simultaneous Multithreading, by Jack L. Lo, Susan J. Eggers, Joel S. Emer, Henry M. Levy, Rebecca L. Stamm, Dean M. Tullsen, ACM Transactions on Computer Systems, vol. 15, No. 3, Aug. 1997, pp. 332–354.

* cited by examiner

Primary Examiner—David Y. Eng
(74) Attorney, Agent, or Firm—Synnestvedt & Lechner LLP

(57) ABSTRACT

A parallel processing architecture for a digital processor capable of alternately operating in a single threaded mode, a SIMD (single instruction, multiple data) mode and a MIMD (multiple instructions, multiple data) mode. The instruction set for the processor includes instructions for switching between modes and exchanging data between the parallel processing paths. The hardware in any instruction path or portion of an instruction path which is not being used is deactivated to save power.

48 Claims, 7 Drawing Sheets

METHOD AND APPARATUS FOR EXECUTING MULTIPLE INSTRUCTION STREAMS IN A DIGITAL PROCESSOR WITH MULTIPLE DATA PATHS

FIELD OF THE INVENTION

The invention pertains to digital processor architectures. More particularly, the invention pertains to the architecture of digital signal processors with multiple data paths.

DESCRIPTION OF THE PRIOR ART

There is an ever present drive to increase the power and speed of digital processors, including central processing units (CPUs) of computers and digital signal processors (DSPs). As such, many pipelined processors have architectures with multiple instruction pipelines thus allowing parallel processing of multiple instructions. In general, processor architecture designers have been relatively successful in increasing speed and power almost twofold over single pipeline processors with architecture designs having dual parallel instruction pipelines. However, obtaining correspondingly large increases in performance by further increasing the number of parallel instruction pipelines has proven to be more difficult. That is, in general, the shift from two to four parallel processors has not resulted in anything near a further twofold increase in processing speed or power.

There are several reasons for these diminishing returns. First, the limitations of typical computer codes itself makes it difficult to run more than two parallel instruction pipelines efficiently because of the dependency of subsequent instructions on the results of the execution of previous instructions (commonly termed data dependencies).

Another problem with increasing the number of parallel instruction pipelines much greater than two is that multiple instruction pipelines can create bottle necks at register file and memory ports.

There are at least three general schemes of parallelism for multiple instruction pipeline digital processors in use today. They are herein termed 1) superscalar, 2) VLIW (very long instruction word), and 3) multi-processing. Superscalar parallel processors generally use the same instruction set as single pipeline processors. The processor core includes hardware which examines a window of contiguous instructions in a program, identifies instructions within that window which can be run in parallel, and sends those subsets to different instruction pipelines in the processor core. The hardware necessary for selecting the window and parsing it into subsets of contiguous instructions which can be run in parallel is complex and consumes significant area and power. Thus, while superscalar parallelism may be practical in CPUs, its power and size requirements frequently make it unacceptable for DSP applications with stricter size and power requirements. VLIW parallelism involves the use of code comprising very long instruction words in which each VLIW actually comprises multiple instructions which are not dependent on each other and therefore can be run in parallel. In VLIW parallelism, the writer of the code or the compiler actually determines what instructions are independent and therefore can be run in parallel with each other. The code is either written or compiled to cause such independent instructions to be grouped into a VLIW. Each VLIW is parsed and then fed into multiple issue slots in the processor for execution. For example, the processor architecture might accept a sixty-four bit VLIW which actually comprises four separate individually executable sixteen bit instructions. Within the processor core, the four different sixteen bit instructions are run through four parallel instruction pipelines, each instruction pipeline including its own instruction decoder stage and execute stage.

A third method, termed multiprocessing, is the oldest and simplest of the three methods. The basic architecture of a multiprocessing system comprises two or more essentially entirely independent and parallel processors. The program writer writes the code in separate chunks which can be run independently on two different processors. Results and operands may be shared amongst the processors by writing to shared memory.

One form of multi-processing is commonly termed MIMD (multiple instructions, multiple data).

Another incarnation of parallel processing is termed SIMD (single instruction, multiple data). In SIMD type parallel processing, a single instruction is decoded and run through multiple processor pipelines wherein, in each processor pipeline, it operates on different data sets. SIMD is particularly adapted for repetitive tasks in which the same instruction is repeated many times. For instance, SIMD is particularly suitable for video data processing in which one common routine requires the contents of two sixty-four bit registers to be added to each other repetitively. In SIMD, a single instruction can be sent to eight different processing lines which can add the contents of the two 64 bit registers in eight bit chunks.

It should be apparent that the number of parallel processing threads and the type of parallelism (e.g., SIMD, MIMD, superscalar, etc.) that will most effectively increase performance is highly dependent on the particular software routine that is being executed.

U.S. Pat. No. 5,475,856 issued to Kogge discloses a dynamic multi-mode processing array that combines several of the different parallel processing concepts into a single processing array that can alternately be switched to operate in a SIMD mode, a MIMD mode or a single instruction, single data (SISD) mode during the execution of a single program. However, the device disclosed in U.S. Pat. No. 5,475,856 is adapted for use in connection with desk top computers and significantly increases power consumption and cost. The device disclosed in U.S. Pat. No. 5,475,856 is not particularly suited for the DSP environment where minimizing cost and power consumption typically are of primary concern. Specifically, the device disclosed in U.S. Pat. No. 5,475,856 includes a complex interconnection network and an extra bit in each instruction word to indicate the operational mode of each instruction pipeline.

SUMMARY OF THE INVENTION

The invention is a parallel digital processor comprising a plurality of parallel pipelined instruction paths which preferably share a common instruction memory and a common data memory. Each parallel instruction pipeline includes at least an instruction fetch stage, an instruction decoder stage and an execute stage. There are registers for each pipeline for temporarily storing data needed by, or generated as a result of, instructions. The architecture is capable of running in various modes, including single threaded mode, SIMD mode and MIMD mode. The instruction set includes instructions that cause the architecture to switch between various modes on the fly during execution of application software.

DETAILED DESCRIPTION OF THE INVENTION

Figure 1:
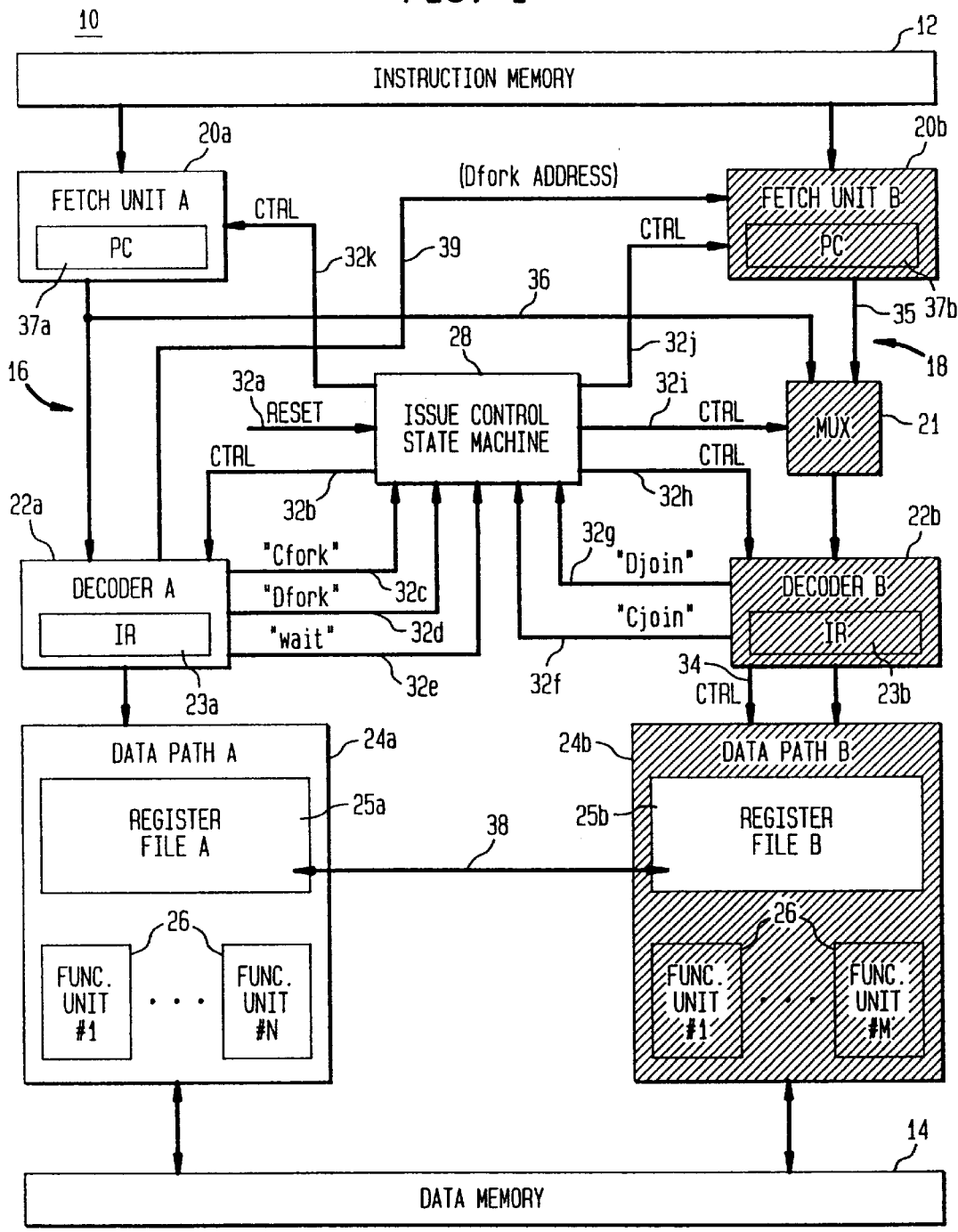
FIG. 1 is a block diagram of an exemplary digital processor architecture in accordance with the present invention having two instruction pipelines.

While the invention is particularly suited for and herein described with respect to digital signal processors, it should be understood that the present invention has applications in connection with any type of digital processing.

In accordance with the present invention, a digital processor is capable of operating in at least three different modes of parallelism, namely, a single threaded mode, a single instruction, multiple data (SIMD) mode, and a multiple instruction, multiple data (MIMD) mode.

The single threaded mode is the simplest mode. In this mode, only one instruction pipeline is active, except that the register files in the execute stages of all other instruction pipelines are accessible, via a register bus, to the execute stage in the active, primary pipeline. In the single threaded mode, instructions are executed essentially as they would be in a standard single pipelined processor, except for the fact that data can be loaded into or from the registers in the execute stages of the other instruction pipelines. This will allow instructions in the main pipeline to load data into the register files of the other pipelines that may be needed in the other pipelines prior to initiating one of the parallel operation modes.

In the SIMD mode, the fetch stage, decoder stage, and execute stage of the first of the parallel instruction pipelines is fully operational. One or more of the decoder stages of the other instruction pipelines are coupled to receive the instructions fetched by the fetch stage of the first instruction pipeline. For the second and/or subsequent instruction pipelines, the decoder stage and execute stage are operational, but the fetch stage remains idle. The SIMD mode is particularly useful for processing which entails very repetitive operations (using the same instruction over and over again) on different data. Since the register files in all of the execute stages are accessible by all other execute stages, the results can be combined in the primary instruction pipeline to generate a final result at the completion of the repetitive task.

In the MIMD mode, the full hardware of two or more of the instruction pipelines are fully operational. In this mode, each instruction pipeline individually fetches instructions from the instruction memory using its own fetch stage and fetches its own data, using its own execute stage and register file to retrieve data.

Instructions are included in the instruction set to provide for switching between modes directly under software control. Accordingly, when only single-thread operation is required, power is saved by deactivating the hardware in the other instruction pipelines (e.g., deactivating the clock signals to the hardware). However, for software routines or portions thereof where SIMD operation or MIMD operation is practical and efficient, the software can temporarily (or permanently) enter one of these parallel processing modes and use as many parallel instruction pipelines as is efficient for the given software routine.

The registers associated with the second and subsequent instruction pipelines are operational regardless of the mode since, in many applications, it will be necessary to initialize a register to be used by the second and/or subsequent instruction pipelines before they can begin operating, particularly in the SIMD mode.

FIG. 1 is a block diagram illustrating the processor architecture of a first preferred embodiment of a dual instruction pipeline processor in accordance with the present invention. It should be understood that the dual pipeline architecture illustrated in FIGS. 1–4 is exemplary and that the invention is extendable to processors having any number of parallel instruction pipelines. The processor 10 according to the present invention includes an instruction memory 12 and a data memory 14. What will herein be termed the primary instruction pipeline is shown at 16. A secondary instruction pipeline is shown at 18.

The pipeline may be of any known configuration. In fact, the processing paths need not even be pipelined in order to practice the present invention. Although pipelining is preferred in order to best capitalize on the features of the invention.

In a preferred embodiment, each pipeline comprises at least a fetch stage 20, a decoder stage 22 and an execute stage 24. As is well known, each of these stages may be composed of further sequential stages. There also may be additional stages. However, in order not to obfuscate the invention, FIGS. 1–4 illustrate a simple architecture comprising only these three stages. The fetch stages 20a and 20b retrieve instructions from the instruction memory 12 and forward them to the decoder stage units 22a and 22b. Each of the fetch stages 20a and 20b includes a program counter 37a or 37b.

Decoder stages 22a and 22b decode the instructions and issue control signals to the corresponding execute stages 24a and 24b respectively. Each of the decoder stages 22a and 22b includes an instruction register 23a or 23b.

In response to the control signals, the execute stages 24a and 24b execute the instructions. It should be understood by those of skill in the art that an execute stage typically comprises one or more processing units such as an ALU, MAC, or the like. Such processing units are generally represented in the figure as function units 1 through N in the primary pipeline and 1 through M in the secondary pipeline, labeled 26. There is a register file 25 for each of the execute stages 24a and 24b for temporarily storing data such as operand data or data calculated as the result of the execution of an instruction. The data stored in the register file 25 are data to be operated on by the instructions. The register files of all of the pipelines may be comprised of a single memory device. In accordance with the scheme of the present invention, data may be exchanged (responsive to the appropriate instruction or instructions) between the register file 25a of execute stage 24a of the primary instruction pipeline 16 and the register files 25b of execute stage 24b of the secondary instruction pipeline 18 via a register bus 38. The exchanged data, here, are actual data to be operated on by the instructions.

The architecture also contains an issue control state machine 28. The issue control state machine 28 is coupled to receive control signals from the decoder stages 22a and 22b of the various instruction pipelines 16 and 18.

Three instructions in the instruction set, namely CFORK, DFORK, and WAIT, produce control signals 32c, 32d and 32e, respectively, that may be issued from the decoder stage 22a of the primary instruction pipeline 16 to the issue control state machine 28. Two other instructions, namely, CJOIN and DJOIN, produce control signals 32f and 32g which may be issued from the decoder stage 22b in the secondary instruction pipeline 18 to the state machine 28. These instructions will be described in more detail below.

The secondary instruction pipeline 18 also includes a multiplexer 21 positioned between the fetch stage 20b and decoder stage 22b. The multiplexer 21, under control of issue control state machine 28, which in turn is responsive to the CFORK, DFORK, DJOIN and/or CJOIN instructions as explained more fully below, accepts instructions either from the fetch stage 20b of the corresponding instruction pipeline 18 via line 35 or from the fetch stage 20a of the primary instruction pipeline 16 via line 36.

Path 39 is a data path from the decoder 22a of the primary instruction pipeline 16 to the fetch stage 20b of the secondary instruction pipeline 18. This path is provided so that the primary instruction pipeline 16 can provide an instruction memory address from which to begin fetching instructions when the fetch stage 20b of the secondary instruction pipeline 18 is activated.

In addition, there is a reset control line 32a for inputting a reset signal to the state machine 28. The reset signal resets the state machine to the single threaded mode.

Figure 2:
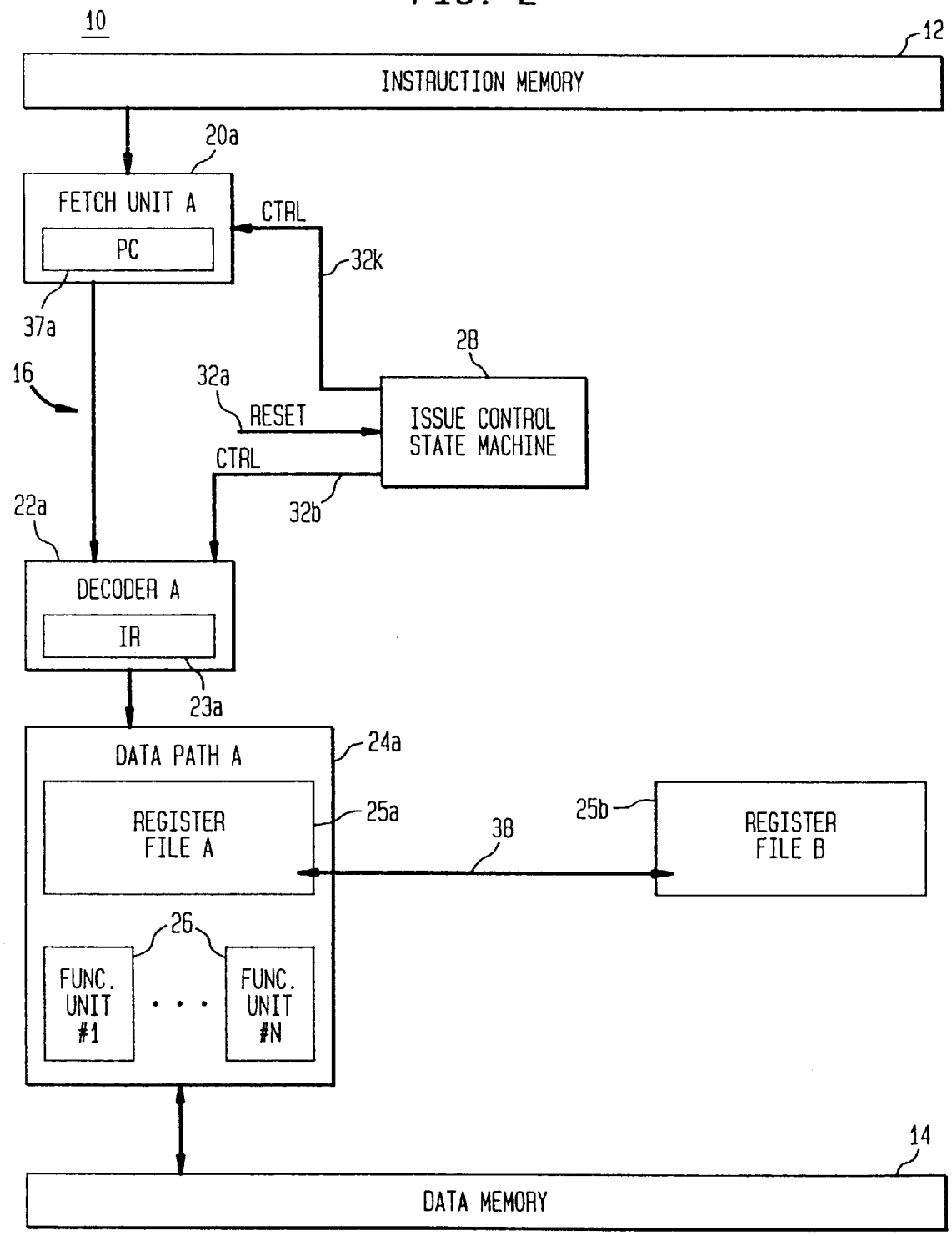
FIG. 2 is a block diagram showing the components of the exemplary embodiment of the invention of FIG. 1 showing those components that are active in the single-threaded mode.

FIG. 2 is a block diagram corresponding to the embodiment of FIG. 1 showing the active components when the processor 10 is in the single threaded mode. Operation in this mode is substantially similar to a standard single instruction pipeline architecture. Fetch stage 20a retrieves instructions from instruction memory 12 and forwards them to decoder stage 22a. Decoder stage 22a decodes the instructions and issues control signals to cause execute stage 24a to execute the instructions. If necessary, data is retrieved from or forwarded to data memory 14. Also, data may be read from or written to register file 25a. Additionally, a register bus 38 is provided so that data may be loaded into or from the register file 25b in the secondary instruction pipeline 18. State machine 28 is operational but, in single threaded mode, operation has no significant functions relevant to this invention. Other than the register file 25b, all components in secondary instruction pipeline 18 are deactivated.

The programmer will write the software routine to operate in this mode when there is no speed or other processing advantage to be gained from parallel processing. However, many programs contain at least portions thereof that can benefit from processing in a SIMD type mode or a MIMD type mode. For example, in video processing, it is frequently necessary to add the contents of two 64 bit registers to each other and store the result, repeatedly. Such operation can be greatly sped up by partitioning the 64 bit words into eight separate bytes and adding the bytes separately in eight parallel instruction pipelines. SIMD type multi-processing would be particularly suitable for this routine since all eight pipelines execute the same instruction simultaneously, although on different data. Thus, in accordance with the invention, the code would be written so as to cause the processor 10 to switch from the single threaded mode to the SIMD mode when this operation is to be performed.

Using the above-described video processing routine as an example, when program execution reaches a point where this operation is to occur, the program includes the instructions necessary to prepare for and to enter the SIMD mode. Particularly, while still in the single threaded mode, a MOVE AtoB instruction will be executed in the primary instruction pipeline that will load the data that is needed in the register file in the secondary instruction pipeline (or pipelines) before multi-processing can commence. For instance, in the video processing example, the data might be a pointer to the address in data memory containing the first byte to be added in the secondary pipeline.

The MOVE AtoB instruction is one of several extra instructions in the instruction set that are particularly adapted for this architecture (hereinafter termed "special instructions"). The instructions, however, are not necessarily strictly dedicated to effectuating the present invention and may have other useful functions independent of the present invention. In a preferred embodiment, the MOVE AtoB instruction is a register to register operation. Thus, in this embodiment, the MOVE AtoB instruction would be preceded by a LOAD or similar instruction that first loads the pointer address from data memory 14 to register 25a before the data is MOVEd from register 25a to register 25b. Further, it should be understood that, depending upon the particular software routine, no MOVE AtoB operation may be necessary or multiple MOVE AtoB operations may be necessary before entering a multi-processing mode.

The primary instruction pipeline will then execute a CFORK instruction. The CFORK instruction is one of the special instructions and, specifically, is the instruction which activates one or more secondary instruction pipelines in the SIMD mode. In an embodiment of the invention with more than one secondary instruction pipeline, the CFORK instruction identifies which instruction pipeline(s) are to be activated.

Figure 3:
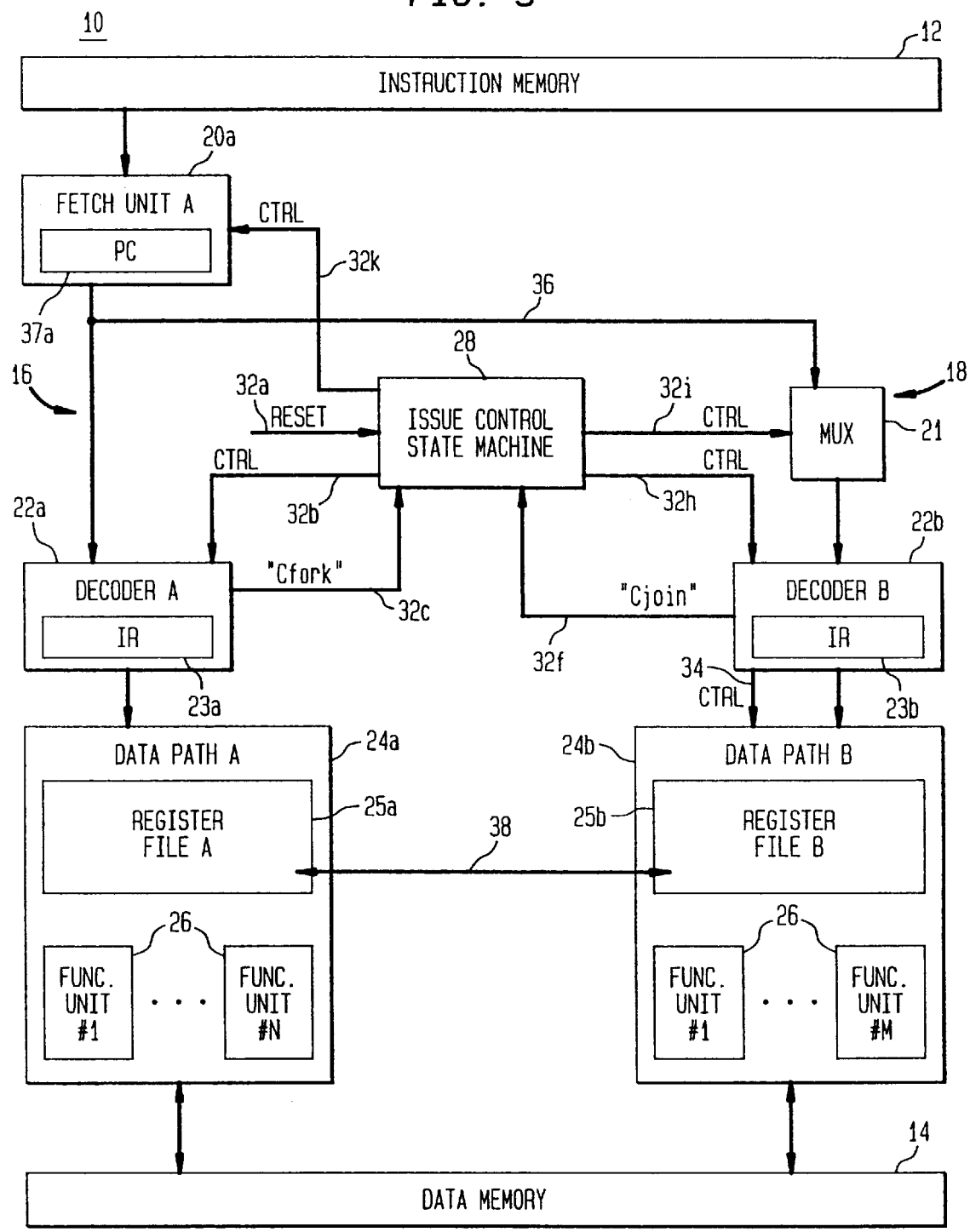
FIG. 3 is a block diagram showing the components of the exemplary embodiment of the invention of FIG. 1 showing those components that are active in the SIMD mode.
Figure 4:
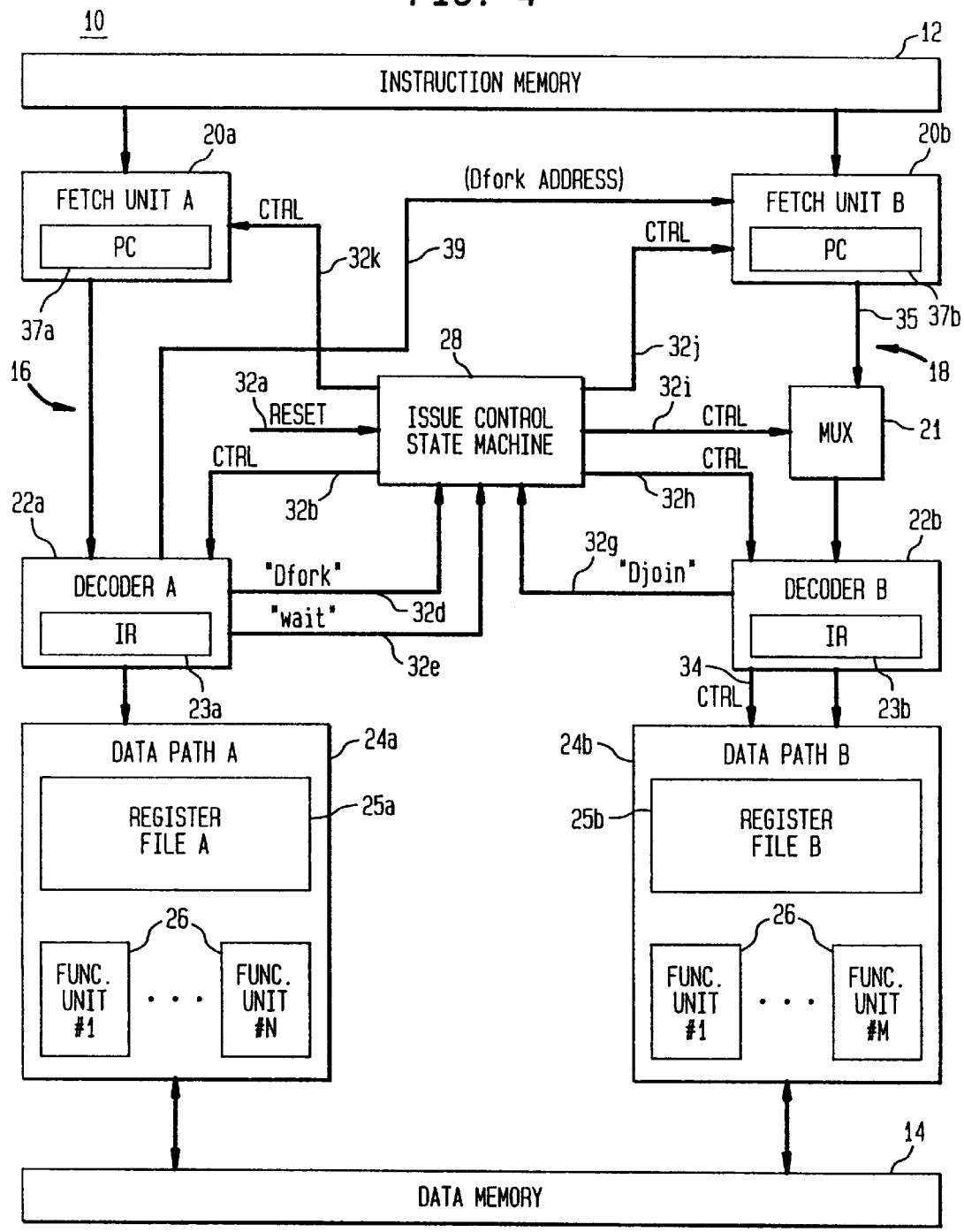
FIG. 4 is a block diagram showing the components of the exemplary embodiment of the invention of FIG. 1 showing those components that are active in the MIMD mode.

FIG. 3 shows the active components of the processor core architecture for operation in the SIMD mode in accordance with the present invention. Responsive to the CFORK instruction and the corresponding signal on control line 32c generated by decoder 22a, the state machine 28 issues a control signal on line 32i instructing multiplexer 21 to accept data from input line 36 from the fetch stage 20a of the primary instruction pipeline 16. It also issues a signal on control line 32h that activates the decoder stage 22b in the secondary instruction pipeline 18. The execution stage 24b also is activated via control line 34. Secondary instruction pipeline 18 then commences to execute the code fetched by fetch stage 20a, while primary instruction pipeline 16 continues to execute the same instructions.

At the end of this routine (i.e., when the multiple parallel instruction pipelines have completed all of the adds of the video processing routine), the code includes a CJOIN instruction. CJOIN is one of the special instructions. The CJOIN instruction has no effect in the primary instruction pipeline 16. The CJOIN instruction causes a CJOIN control signal to be issued on line 32f to the state machine 28. In response to this control line, the state machine 28 issues signals on control lines 32h and 32i deactivating the secondary instruction pipeline 18. Processing thus returns to single threaded mode in order to allow the primary instruction pipeline 16 to combine the results. Particularly, once back in single threaded mode, the primary instruction pipeline 16 can execute MOVE BtoA instructions to read out the data from the appropriate location in the register file 25b of the secondary instruction pipeline 18 to register file 25a in the primary pipeline 16 and then add the video data to the result stored in the primary pipeline register file 25a to obtain the final result. Other subsections of the code may be such that significant performance increases may be obtained through operation in the MIMD mode. Such a situation would exist with respect to any software subset in which relatively large sections of code can be executed independently of other sections, e.g., without data dependencies between code sections.

As described above with respect to entering the SIMD mode, it may be necessary to move data from the first register file 25a into the secondary register file 25b (MOVE AtoB), while still in single threaded mode, in order to set it up before the processor can operate in MIMD mode. Then, referring now to FIG. 4, the primary instruction pipeline 16 receives a DFORK instruction. DFORK is one of the special instructions. This instruction indicates that the architecture is to enter the MIMD mode. Accordingly, in response to the DFORK instruction, the DFORK control line 32d to state machine 28 is activated. Responsive to the DFORK control signal on line 32d, state machine 28 issues signals on control line 32h and 32j turning on fetch stage 20b and decoder stage 22b in the secondary instruction pipeline 18. It also issues a signal on control line 32i instructing multiplexer 21 to accept instructions from fetch stage 20b through input line 35. The execute stage 24b in the secondary instruction pipeline 18 is also turned on via control line 34 as previously described. In addition, the DFORK instruction includes an address of the first instruction to be executed by the secondary instruction pipeline 18. That address is provided from decoder 22a to fetch stage 20b via DFORK address line 39.

The two threads 16 and 18 then will operate essentially independently of each other, reading and executing different instructions and using different data. As discussed above with respect to the SIMD mode, at an appropriate point, operation may return to the single threaded mode. The code for the secondary instruction pipeline 18 would include a DJOIN instruction at this point. DJOIN is one of the special instructions. If any data needs to be combined, it can be accomplished in the single threaded mode by MOVE-ing data out of appropriate locations in register file 25b of the secondary instruction pipeline 18.

Since, in MIMD mode, the multiple pipelines are operating essentially independently of each other, it is possible for the primary pipeline to reach a point at which it needs data being generated in the secondary pipeline. Further, it may reach that point prior to the time when that data is generated in the secondary pipeline. Accordingly, one of the special instructions in the instruction set is a WAIT instruction which will pause the execution of instructions in the primary pipeline 16 pending execution of a DJOIN instruction in the secondary pipeline 18. Particularly, responsive to a WAIT instruction, the primary pipeline decoder 22a sends a control signal on line 32e to state machine 28. In response, the state machine 28 issues control signals on lines 32b and 32k suspending operation of the fetch and decoder stages 202 and 222 in the primary instruction pipeline 16 until the state machine 28 receives a DJOIN control signal on line 32g. In response to the DJOIN signal, the state machine 28 releases the pause on the execution of instructions in the primary instruction pipeline 16 via control line 32k into fetch stage 20a and via control line 32b into decode stage 22a and deactivates the secondary instruction pipeline 18 components via control lines 32h, 32j, 32i and 34, except for register file 25b.

Accordingly, the processor 10 can operate in a single threaded mode, a SIMD mode or a MIMD mode, as best suits the particular portion of software being executed. The instruction set includes the aforementioned instructions DFORK, CFORK, DJOIN, CJOIN, MOVE AtoB, MOVE BtoA and WAIT to fully exploit switching between the various modes on the fly during program execution. Accordingly, power is saved by deactivating processor elements in the secondary pipelines which are not needed for processing. However, when it is efficient to operate in a SIMD mode or MIMD mode, the appropriate components in the secondary instruction pipelines can be activated and the processor 10 can begin operating in such mode.

Figure 5:
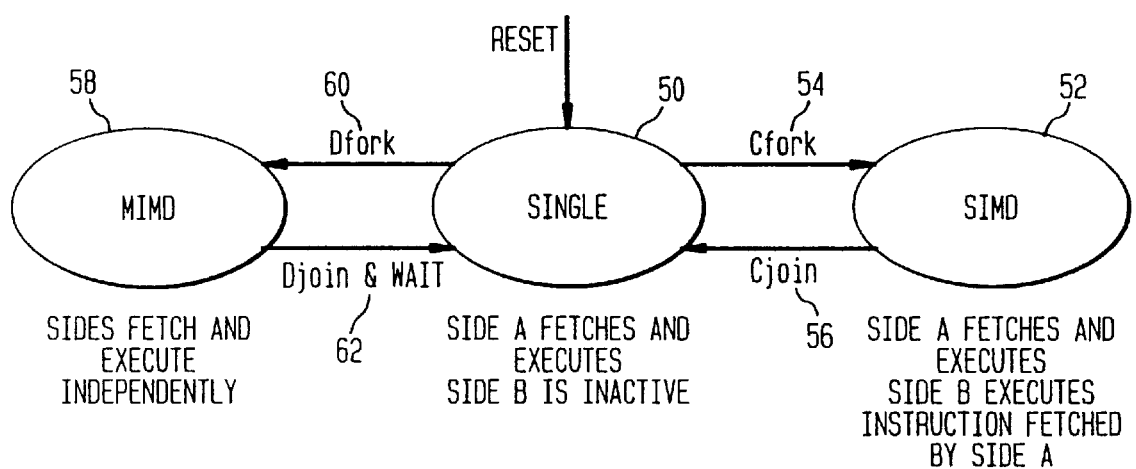
FIG. 5 is a state diagram illustrating transitions between the various operational modes of a processor constructed in accordance with the present invention.

FIG. 5 is a state diagram illustrating the various modes of operation and the instructions for switching therebetween according to the present invention. As shown in FIG. 5, when in single threaded mode 50, operation is converted to SIMD mode 52 through CFORK instruction 54. Operation is returned from the SIMD mode 52 to the single threaded mode 50 via a CJOIN instruction 56 in the secondary pipeline. In a similar manner, the mode of operation can be switched from the single threaded mode 50 to the dual threaded mode 58 by issuing a DFORK instruction 60. Operation returns from the MIMD mode 58 to the single threaded mode 50 through the execution of a DJOIN instruction in the secondary pipeline and a WAIT instruction in the primary pipeline as illustrated at 62. In a preferred embodiment of the invention, there is no ability to directly switch from SIMD mode 52 to dual threaded mode 58. However, the architecture can be switched between the two modes, if necessary, by consecutive CJOIN and DFORK instructions.

Printed below are examples of a software routine for adding an array of eight values stored consecutively beginning at an address, Ptr, in the data memory and storing the calculated sum at the address, Result, in the data memory in each of the three above-described modes. For simplicity, we will assume that the instruction pipelines are simple RISC (Reduced Instruction Set Computer) pipelines. In single-threaded mode, the code would be:

| 1  | Mov | R1,  | Ptr    |    |
|----|-----|------|--------|----|
| 2  | Mov | R3,  | 0      |    |
| 3  | LD  | R2,  | *R1++  |    |
| 4  | Add | R3,  | R2,    | R3 |
| 5  | Ld  | R2,  | *R1++  |    |
| 6  | Add | R3,  | R2,    | R3 |
| 7  | Ld  | R2,  | *R1++  |    |
| 8  | Add | R3,  | R2,    | R3 |
| 9  | Ld  | R2,  | *R1++  |    |
| 10 | Add | R3,  | R2,    | R3 |
| 11 | Ld  | R2,  | *R1++  |    |
| 12 | Add | R3,  | R2,    | R3 |
| 13 | Ld  | R2,  | *R1++  |    |
| 14 | Add | R3,  | R2,    | R3 |
| 15 | Ld  | R2,  | *R1++  |    |
| 16 | Add | R3,  | R2,    | R3 |
| 17 | Ld  | R2,  | *R1    |    |
| 18 | Add | R3,  | R2,    | R3 |
| 19 | St  | Res, | R3     |    |

In particular, instruction 1 loads the pointer address, Ptr, into the register location R1 in the primary register file 25a. Instruction 2 initializes register location R3 to zero. Instruction 3 loads register location R2 with the contents of the memory address, Ptr, which was stored in register location R1 by instruction 1 and increments the contents of R1.

Instruction 4 adds the contents of registers R2 and R3 writes the result to register R3. Instruction 5 loads register location R2 with the contents of the memory address now in R1 and further increments R1. Instruction 6 adds the contents of R2 to R3 and stores the result in R3. The process is repeated continuously in instructions 7 through 18 until all eight numbers have been summed. Finally, in step 19, the contents of R3 are stored to data memory address, Res(ult).

This code could be executed more quickly in MIMD mode as illustrated below.

| | | Primary Pipeline | | |
|---|---|---|---|---|
| 1 | | Mov | R1, | Ptr |
| 2 | | Mov | R3, | 0 |
| 3 | | Dfork | Sum4 | |
| 4 | | Ld | R2, | *R1++ |
| 5 | | Add | R3, | R2, | R3 |
| 6 | | Ld | R2, | *R1++ |
| 7 | | Add | R3, | R2, | R3 |
| 8 | | Ld | R2, | *R1++ |
| 9 | | Add | R3, | R2, | R3, |
| 10 | | Ld | R2, | *R1++ |
| 11 | | Add | R3, | R2, | R3 |
| 12 | | WAIT | | |
| 13 | | MovBtoA | R2, | R3 |
| 14 | | Add | R3, | R2, | R3 |
| 15 | | St | Res,R1 | |
| | | Secondary Pipeline | | |
| 1 | Sum4: | Mov | R1, | Ptr+4 |
| 2 | | Mov | R3, | 0 |
| 3 | | Ld | R2, | *R1++ |
| 4 | | Add | R3, | R2, | R3 |
| 5 | | Ld | R2, | *R1++ |
| 6 | | Add | R3, | R2, | R3 |
| 7 | | Ld | R2, | *R1++ |
| 8 | | Add | R3, | R2, | R3 |
| 9 | | Ld | R2, | *R1++ |
| 10 | | Add | R3, | R2, | R3 |
| 11 | | DJOIN | | |

In MIMD mode, the first two instruction in the primary pipeline are the same. Instruction 3 is a DFORK instruction telling the secondary instruction pipeline to begin executing instructions at instruction memory address Sum4. Steps 5 through 11 in the primary instruction pipeline add the first four of the eight numbers in the same manner described above with respect to the single threaded mode. Meanwhile, in the secondary instruction pipeline, the first instruction executed loads register location R1 in the secondary instruction pipeline with the address of the first number to be added by the secondary instruction pipeline. Since the primary instruction pipeline will be adding the first four numbers, this address is Ptr+4. Instruction 2 initializes register location R3 to 0. Instructions 3 through 10 add the second group of four of the eight numbers in the same manner described above.

Instruction 12 in the primary instruction pipeline is a WAIT instruction that tells the primary instruction pipeline to halt operation until a DJOIN instruction is executed in the secondary instruction pipeline. The primary instruction pipeline must wait because the next operation to be executed is to combine the results calculated in the primary instruction pipeline with the results calculated in the secondary instruction pipeline. This cannot be done until the secondary instruction pipeline completes its task and executes the DJOIN instruction.

When the secondary instruction pipeline completes its adds it executes the DJOIN instruction.

The primary instruction pipeline now proceeds to execute instruction 13. Instruction 13 moves the contents of register location R3 in the register file 25b in the secondary instruction pipeline (containing the result of the addition of the four numbers in the secondary instruction pipeline) to register location R2 in the register file 25a in the primary instruction pipeline. Instruction 14 then adds those two numbers and stores the result R3. Finally, in step 15, the result is written from R3 to data memory location, Res(ult).

As can be seen, in MIMD mode, the routine which required 19 instruction cycles in the single threaded mode is completed in MIMD mode in 15 cycles.

The operation also could be performed in SIMD mode, as illustrated below.

| 1 | Mov | R1, | Ptr | |
|---|---|---|---|---|
| 12 | Mov | R3, | 0 | |
| 13 | Mov | R4, | Ptr+4 | |
| 14 | MovAtoB | R1, | R4 | |
| 15 | MovAtoB | R3, | R3 | |
| 16 | CFORK | | | |
| 17 | Ld | R2, | *R1++ | |
| 18 | Add | R3, | R2, | R3 |
| 19 | Ld | R2, | *R1++ | |
| 10 | Add | R3, | R2, | R3 |
| 11 | Ld | R2, | *R1++ | |
| 12 | Add | R3, | R2, | R3 |
| 13 | Ld | R2, | *R1++ | |
| 14 | Add | R3, | R2, | R3 |
| 15 | CJOIN | | | |
| 16 | MovBtoA | R2, | R3 | |
| 17 | Add | R3, | R2, | R3 |
| 18 | St | Res, | R3 | |

In SIMD mode, instructions 1 and 2 are the same as described above. Instruction 3 loads register location R4 in primary register file 25a with the address of the first number to be added in the secondary instruction pipeline. Since the secondary instruction pipeline will be adding the second group of four numbers, this address is Ptr+4.

Instruction 4 MOVEs Ptr+4 from location R4 in primary register file 25a to register location R1 in secondary register file 25b. Instruction 5 initializes register location R3 in register file 25b in the secondary instruction pipeline to 0 by simply transferring the zero in register location R3 in primary register file 25a to location R3 in the secondary register file 25b. Instruction 6 is a CFORK instruction activating the decoder and execute stages in secondary instruction pipeline 18. Instructions 7 through 14 are four consecutive LOAD and ADD AND INCREMENT instruction pairs as previously described. However, in SIMD mode these instructions are being executed in parallel in both pipelines, such that eight adds are performed. The first four numbers are added in the primary instruction pipeline and the second group of four numbers are added in the secondary instruction pipeline. Instruction 15 is a CJOIN instruction returning operation to the single threaded mode. Instructions 16 through 18 are identical to instructions 13 through 15 described above in connection with MIMD operation and combine the results and write the sum to memory address, Res(ult), as previously described.

It should be understood that, in the routine illustrated in these examples, in which only 8 numbers are being added, the time saving is relatively small (e.g., a reduction from 19 instruction cycles in single threaded mode to 18 instruction cycles in SIMD mode or 15 instruction cycles in dual threaded mode). However, as the number of repetitive adds increases (a more practical application would likely require thousands of consecutive adds rather than eight), the savings in instruction cycles will rapidly approach 50%.

Figure 6:
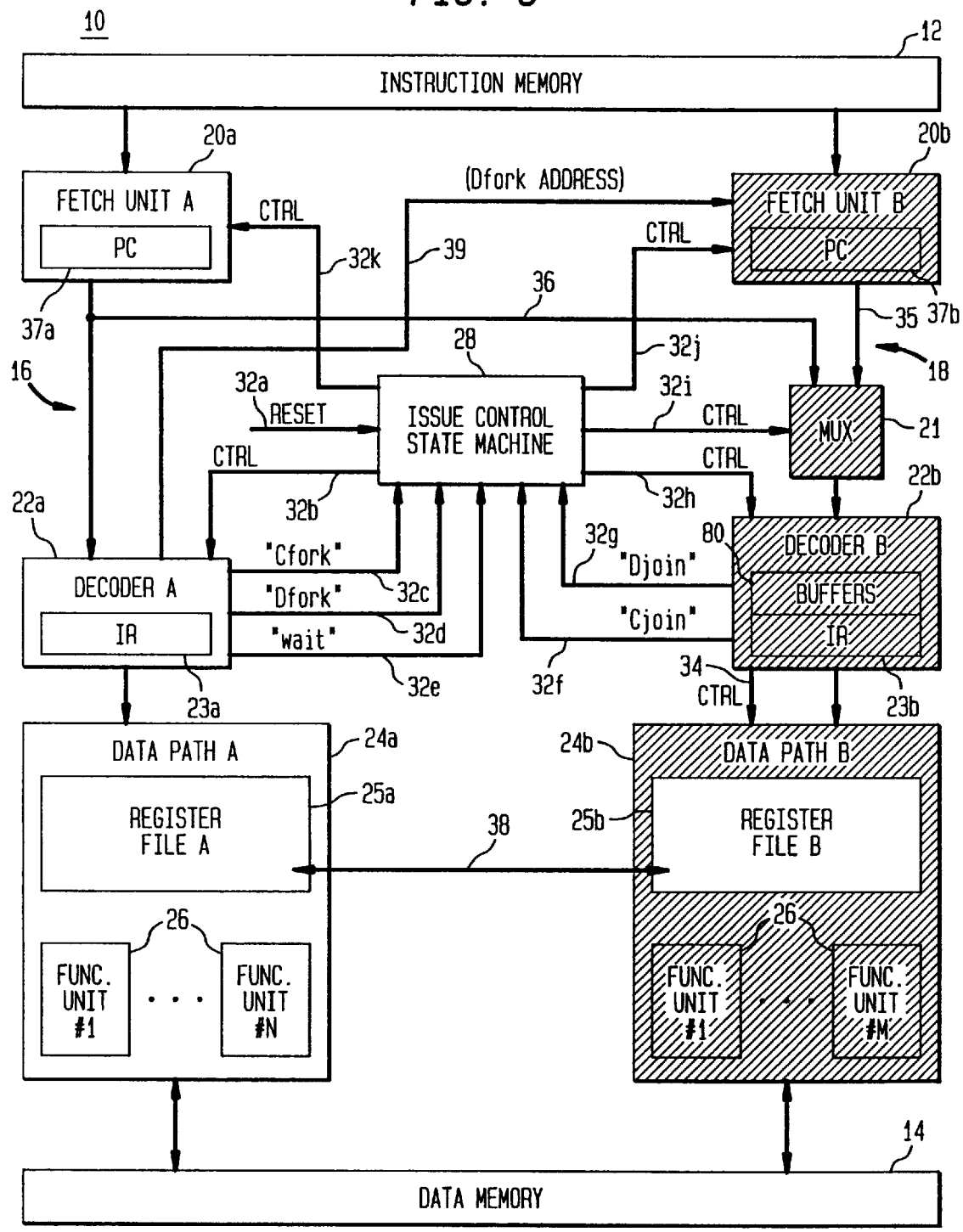
FIG. 6 is a block diagram illustrating the overall architecture of a parallel processor in accordance with a second preferred embodiment of the present invention.

FIG. 6 shows an alternate embodiment of the present invention. This embodiment is essentially identical to the first embodiment described above except for the addition of buffers 80 in the decode stage of each secondary instruction pipeline. The purpose of the buffer is simply to provide a time delay between the pipelines. Particularly, since the various instruction pipelines each access the instruction memory and the data memory, there is the possibility of significant contention between the pipelines for such access. Further, and particularly in the SIMD mode, accesses to data memory by the various instruction pipelines will be simultaneous. Accordingly, by adding buffers 80 in the secondary instruction pipeline(s), the execution of the instructions in the various instruction pipelines can be offset in time from the execution of the instructions in the other pipelines. This should reduce the occurrence of contentions for access to data memory. The length of the delay through the buffers should be made different for each secondary instruction pipeline, if there is more than one secondary instruction pipeline.

While FIGS. 1–6 illustrate a dual instruction pipeline embodiment of the invention, it should be understood that the invention is applicable to a system having any number of parallel instruction pipelines. Additional features would include CFORK and DFORK instructions which specifically identify the particular one or ones of the secondary instruction pipelines to be activated (either in SIMD or MIMD mode). There is no requirement that all the secondary processors be in the same multi-processing mode or that they enter or exit an operational mode at the same time.

Figure 7:
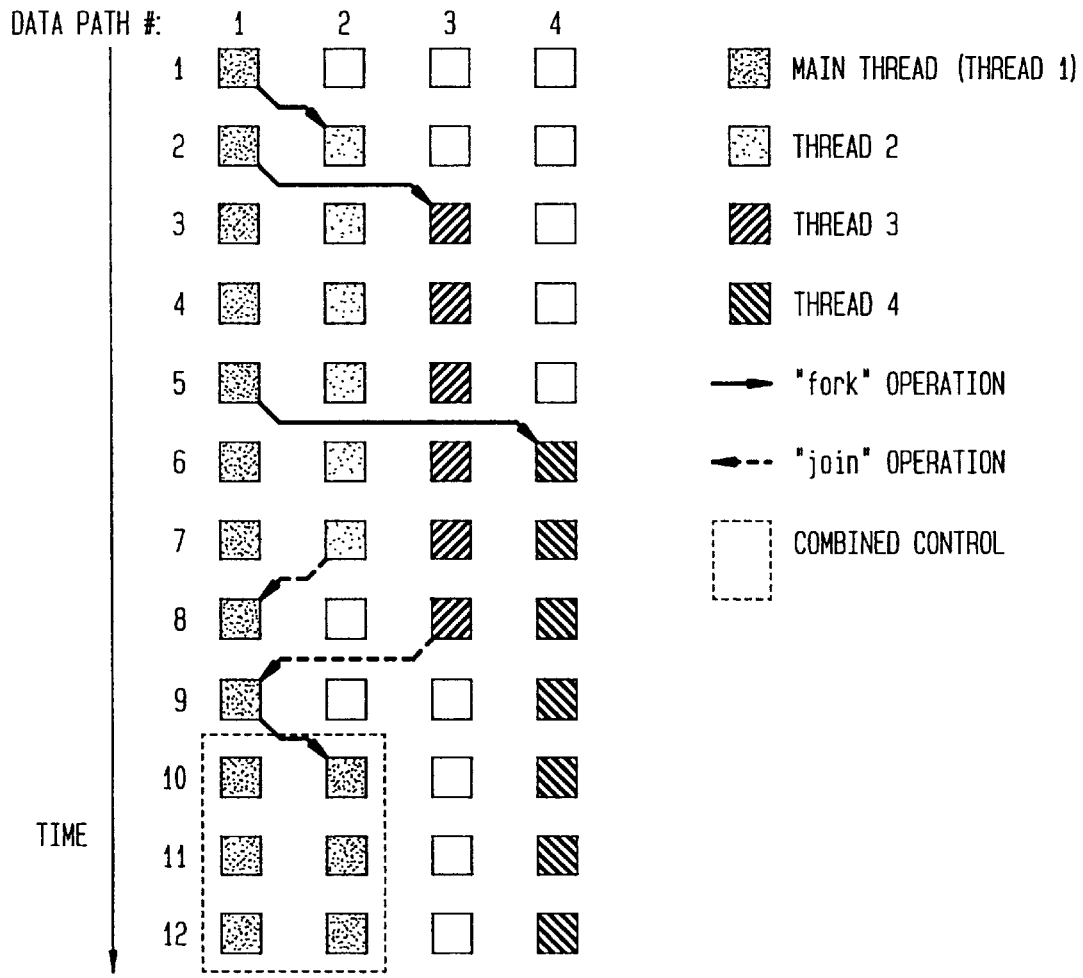
FIG. 7 is a diagram illustrating operation of a processor in accordance with the present invention having four instruction pipelines.

FIG. 7 illustrates an exemplary flow of instructions through a processor architecture constructed in accordance with the present invention comprising four parallel instruction threads. At time t1, the processing core is operating in the single-threaded mode with only thread 1 operating. At time t1, however, instruction pipeline 1 executes a DFORK instruction causing instruction pipeline 2 to begin operating in MIMD mode at time t2.

Also at time t2, another DFORK instruction is executed in instruction pipeline 1 instructing instruction pipeline 3 to begin operating in MIMD mode. From time t3 to time t5, instruction pipelines 1, 2 and 3 operate independently of each other in MIMD mode. At time t5, another DFORK instruction is executed in instruction pipeline 1 instructing instruction pipeline 4 to begin operating in MIMD mode. Therefore, from time t6 through t7, all four instruction pipelines operate in MIMD mode. At time t7, the routine being executed in instruction pipeline 2 is completed and instruction pipeline 2 executes a DJOIN instruction. Accordingly, at time t8, instruction pipeline 2 is deactivated. Therefore, at time t8, instruction pipelines 1, 3 and 4 are operating in MIMD mode, while instruction pipeline 2 is idle. Also at time t8, instruction pipeline 3 completes it subroutine and issues a DJOIN instruction. Accordingly, at time t9, instruction pipeline 3 is deactivated. Therefore, during time period t9, instruction pipelines 1 and 4 are operating in MIMD mode while instruction pipelines 2 and 3 are idle. At time t9, a CFORK instruction is executed in instruction pipeline 1 activating instruction pipeline 2 in the SIMD mode. Accordingly, at time t10, instruction pipeline 2 starts to accept instructions from the fetch stage in instruction pipeline 1. The decoder stage in instruction pipeline 1, of course, also continues to accept instructions from the fetch stage in instruction pipeline 1. Accordingly, instruction pipelines 1 and 2 execute the same instruction (presumably on different data). Thus, from time t10 through time t12, instruction pipelines 1 and 2 are operating in SIMD mode while instruction pipeline 4 continues to operate independently in MIMD mode.

The invention provides a processor architecture configurable on the fly between a single threaded mode, a SIMD mode and a MIMD mode. This is accomplished without the need to alter the instructions of an existing instruction set, but rather by adding a few instructions to the set. In the disclosed embodiment, these instructions are CFORK, CJOIN, DFORK, DJOIN, WAIT, MOVAtoB and MOVBtoA.

Having thus described a few particular embodiments of the invention, various alterations, modifications, and improvements will readily occur to those skilled in the art. For instance, it should be clear to those of skill in the related arts that the issue control state machine represents merely one possible implementation of a control means for organizing switching between modes and the like. These features may also be provided by a combinational logic circuit or other hardware. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

What is claimed is:

1. An integrated circuit having a single digital processor for switching between different modes of operation, said single digital processor comprising:
    a first instruction pipeline comprising a first fetch stage, a first decoder stage, and a first execute stage, for processing data responsive to an instruction stream;
    a second instruction pipeline comprising a second fetch stage, a second decoder stage, and a second execute stage, for processing data responsive to an instruction stream; and
    a controller, responsive to a first instruction in an instruction stream being processed in said first instruction pipeline, for activating at least a portion of said second instruction pipeline in a first mode in which said second decoder stage and said second execute stage operate upon instructions retrieved by said first fetch stage while said first decoder stage and said first execute stage also operate upon said instructions retrieved by said first fetch stage,
    wherein said second fetch stage is deactivated when said single digital processor is in said first mode.

2. An integrated circuit as set forth in claim 1 wherein said controller comprises a state machine responsive to said first instruction.

3. An integrated circuit as set forth in claim 1 wherein prior to receipt of said first instruction in said instruction stream being processed in said first instruction pipeline, said single digital processor operates in a second mode in which said first instruction pipeline is fully operational and said second instruction pipeline is deactivated except for a portion of said second execute stage.

4. An integrated circuit as set forth in claim 3 wherein said controller, responsive to a second instruction in an instruction stream being processed in said second instruction pipeline, deactivates said second decoder stage and said second execute stage.

5. An integrated circuit as set forth in claim 4 wherein said controller, responsive to a third instruction in an instruction stream being processed in said first instruction pipeline, activates said second fetch stage, said second decoder stage and said second execute stage, whereby said first and second instruction pipelines operate on separate instruction streams simultaneously.

6. An integrated circuit as set forth in claim 5 wherein said third instruction includes an operand field for providing an address to said second instruction pipeline at which said second instruction pipeline is to commence executing instructions.

7. An integrated circuit as set forth in claim 6 wherein said controller, responsive to a fourth instruction in an instruction stream being processed in said second instruction pipeline, deactivates said second fetch stage, said second decoder stage and said second execute stage.

8. An integrated circuit as set forth in claim 7 wherein said controller, responsive to a fifth instruction in an instruction stream being processed in said first instruction pipeline, suspends execution of a next instruction in said first instruction pipeline pending receipt of said fourth instruction in said second instruction pipeline.

9. An integrated circuit as set forth in claim 7 wherein said second instruction pipeline includes a plurality of second instruction pipeline and said first and third instructions include information specifying a particular instruction pipeline to which the instruction pertains.

10. An integrated circuit as set forth in claim 9 wherein said second and fourth instructions include information specifying a particular instruction pipeline to which the instruction pertains.

11. An integrated circuit as set forth in claim 10 wherein said fifth instruction includes information specifying a particular instruction pipeline in which said fourth instruction must be received in order to recommence the execution of instruction.

12. An integrated circuit as set forth in claim 1 wherein said single digital processor further comprises a data path directly coupled between said first decoder stage and said second fetch stage.

13. An integrated circuit as set forth in claim 1 wherein said single digital processor further comprises a multiplexer having a first input coupled to receive instructions fetched by said first fetch stage, a second input coupled to receive instructions fetched by said second fetch stage, an output coupled to said second decoder stage, and a control input coupled to said controller, wherein, responsive to said first instruction, said controller controls said multiplexer to accept instructions at one of said first and second inputs.

14. An integrated circuit as set forth in claim 1 wherein said second execute stage comprises a delay buffer.

15. An integrated circuit as set forth in claim 14 wherein said delay buffer is in said second decoder stage.

16. An integrated circuit as set forth in claim 1 wherein each of said first and second execute stages has at least one register that is accessible to both of said first and second execute stages so that data in said at least one register of said first execute stage can be loaded into said at least one register of said second execute stage by instructions executed in said first instruction pipeline.

17. An integrated circuit as set forth in claim 16 wherein said instructions executed in said first instruction pipeline to load said data into said at least one register of said second execute stage include a MOV AtoB instruction.

18. An integrated circuit as set forth in claim 16 further comprising a bus directly coupling said registers of said first and second instruction pipelines to provide said accessibility.

19. An integrated circuit as set forth in claim 1 wherein said single digital processor further comprises:
   a common instruction memory directly coupled to both said first and second fetch stages.

20. An integrated circuit as set forth in claim 1 wherein said first instruction includes a Cfork instruction.

21. An integrated circuit as set forth in claim 1 wherein said single digital processor further comprises:
   a common data memory, coupled to both said first and second execute stages, for storing data and processed data output from said first and second execute stages.

22. An integrated circuit as set forth in claim 4 wherein said second instruction includes a Cjoin instruction.

23. A method of processing data in a single digital processor for switching between different modes of operation, said single digital processor having a common instruction memory and first and second instruction pipelines, said first instruction pipeline comprising at least a first fetch stage, a first decoder stage and a first execute stage, said second instruction pipeline comprising a second fetch stage, a second decoder stage and a second execute stage, said method comprising the steps of:
   (1) operating in a first mode in which said first instruction pipeline is fully operational to execute instructions retrieved from said common instruction memory and said second instruction pipeline is deactivated;
   (2) activating at least a portion of said second instruction pipeline in a second mode, responsive to a first instruction being processed in said first instruction pipeline, in which said decoder stage and said execute stage of said second instruction pipeline operate upon instructions retrieved by said first fetch stage of said first instruction pipeline while said first decoder stage and said first execute stage also operate upon said instructions retrieved by said first fetch stage; and
   (3) deactivating said second decoder stage and said second execute stage responsive to a second instruction in said second instruction pipeline.

24. A method as set forth in claim 23 further comprising the step of:
   (4) activating said second fetch stage, said second decoder stage and said second execute stage responsive to a third instruction in said first instruction pipeline, whereby said first and second instruction pipelines can operate on separate instruction streams simultaneously.

25. A method as set forth in claim 24 wherein said third instruction includes an operand field containing an address of an instruction at which said second instruction pipeline is to commence executing instructions, said method further comprising the step of:
   (5) providing said address from said first decoder stage of said first instruction pipeline to said second fetch stage of said second instruction pipeline.

26. A method as set forth in claim 25 further comprising the step of:
   (6) deactivating said second fetch stage, said second decoder stage and said second execute stage responsive to a fourth instruction in said second instruction pipeline.

27. A method as set forth in claim 26 further comprising the step of:
   (7) responsive to a fifth instruction in said first instruction pipeline, suspending execution of a next instruction in said first instruction pipeline, pending receipt of said fourth instruction in said second instruction pipeline, such that execution of instructions in said first instruction pipeline can be suspended pending creation of data in said second instruction pipeline.

28. A method set forth in claim 26 wherein said second instruction pipeline includes a plurality of second instruction pipeline and wherein steps (2), (3), (4) and (6) include the step of:
(9) specifying a particular instruction pipeline to which the instruction pertains.

29. A method as set forth in claim 28 wherein step (9) includes the step of:
specifying a particular instruction pipeline in which said fourth instruction must be received in order to recommence the execution of instructions in said first instruction pipeline.

30. A method as set forth in claim 23 wherein, in said deactivating step (3), said second instruction includes a Cjoin instruction.

31. A method as set forth in claim 23 further comprising the step of:
(8) introducing a delay in said second instruction pipeline so as to offset execution of instructions in said first and second instruction pipelines, wherein said delay is in said second decoder stage of said second instruction pipeline.

32. A method as set forth in claim 23 further comprising:
(10) loading, by instructions processed in said first instruction pipeline, data stored in at least one register of said first execute stage into at least one register of said second execute stage.

33. A method as set forth in claim 32 wherein, in said loading step (10), said instructions processed in said first instruction pipeline include a MOV AtoB instruction.

34. A method as set forth in claim 23 wherein, in said activating step (2), said first instruction includes a Cfork instruction.

35. A single digital processor comprising:
a first instruction pipeline comprising a first fetch stage, a first decoder stage, and a first execute stage, for processing data responsive to an instruction stream;
a second instruction pipeline comprising a second fetch stage, a second decoder stage, and a second execute stage, for processing data responsive to an instruction stream; and
control means, responsive to a first instruction in an instruction stream being processed in said first instruction pipeline, for activating said second fetch stage, said second decoder stage and said second execute stage in a first mode, whereby said first and second pipelines operate on separate instructions simultaneously,
wherein, prior to receipt of said first instruction in an instruction stream being processed in said first instruction pipeline, said single digital processor operates in a second mode in which said first instruction pipeline is fully operational and said second instruction pipeline is deactivated except for said at least one register of said second execute stage.

36. A single digital processor as set forth in claim 35 wherein said control means includes means, responsive to a second instruction in an instruction stream being processed in said second instruction pipeline, for deactivating said second fetch stage, said second decoder stage and said second execute stage.

37. A single digital processor as set forth in claim 36 wherein said control means includes means, responsive to a third instruction in an instruction stream being processed in said first instruction pipeline, for activating said second decoder stage and said second execute stage in a second mode in which said second decoder stage and said second execute stage operate upon instructions retrieved by said first fetch stage while said first decoder stage and said first execute stage also operate upon said instructions retrieved by said first fetch stage.

38. A single digital processor as set forth in claim 37 wherein said control means includes means, responsive to a fourth instruction in an instruction stream being processed in said second instruction pipeline, for deactivating said second decoder stage and said second execute stage.

39. A single digital processor as set forth in claim 38 wherein said control means further comprises means, responsive to a firth instruction in an instruction stream being processed in said first instruction pipeline, for suspending execution of a next instruction in said first instruction pipeline pending receipt of said first instruction in said second instruction pipeline.

40. A single digital processor as set forth in claim 36 wherein said second instruction includes a Djoin instruction.

41. A single digital processor as set forth in claim 35 wherein said first instruction includes a Dfork instruction.

42. A single digital processor as set forth in claim 35 wherein each of said first and second execute stages has at least one register that is accessible to both of said first and second execute stages so that data in said at least one register of said first execute stage can be loaded into said at least one register of said second execute stage by instructions executed in said first instruction pipeline.

43. A single digital processor as set forth in claim 42 wherein said instructions executed in said first instruction pipeline for loading said data into said at least one register of said second execute stage include a MOV AtoB instruction.

44. A single digital processor for switching between different modes of operation, said single digital processor comprising:
a common instruction memory for storing therein at least first and second instructions streams;
a first instruction pipeline for executing said first instruction stream stored in said common instruction memory, said first instruction pipeline including a first fetch stage for retrieving said first instruction stream from said common instruction memory, a first decoder stage for decoding said first instruction stream retrieved by said first fetch stage, and a first execute stage for executing said first instruction stream decoded by said first decoder stage;
at least one second instruction pipeline for executing either said first instruction stream obtained from said first instruction pipeline or said second instruction stream obtained from said common instruction memory, said second instruction pipeline including a second fetch stage for retrieving said second instruction stream from said common instruction memory, a selecting unit for selectively receiving one of said second instruction stream from said second fetch stage and said first instruction stream from said first fetch stage, a second decoder stage for decoding one of said first and second instruction streams from said selecting unit, and a second execute stage for executing said instruction stream decoded by said second decoder stage;
a controller for activating at least a portion of said second instruction pipeline responsive to a first instruction being processed in said first instruction pipeline, so that said second instruction pipeline can execute one of said first and second instruction streams; and a common data memory, coupled to both said first and second execute stages, for storing data and processed data output from said first and second execute stages.

45. A single digital processor as set forth in claim 44 wherein each of said first and second instruction pipelines includes at least one register accessible by both of said first and second instruction pipelines so that data in said at least one register of said first instruction pipeline can be transferred to said at least one register of said second instruction pipeline in response to a second instruction.

46. A single digital processor as set forth in claim 45 wherein said second instruction pipeline performs its instruction execution on said transferred data in said at least one register of said second instruction pipeline.

47. A single digital processor as set forth in claim 45 wherein said first instruction pipeline processes said second instruction, said second instruction including a MOV AtoB instruction.

48. A single digital processor as set forth in claim 44 wherein said first instruction includes at least one of a Cfork instruction and a Dfork instruction.

* * * * *